(12) United States Patent
Bermudez

(10) Patent No.: US 6,543,296 B1
(45) Date of Patent: Apr. 8, 2003

(54) METHOD OF MONITORING/MEASURING RIGGING LOADS

(76) Inventor: Ricardo J. Bermudez, P.O. Box 50180, New Bedford, MA (US) 02745

(*) Notice: Subject to any disclaimer, the term of this patent is extended or adjusted under 35 U.S.C. 154(b) by 0 days.

(21) Appl. No.: 09/978,685

(22) Filed: Oct. 18, 2001

(51) Int. Cl.[7] .................................................. G01N 3/08
(52) U.S. Cl. ............................................................ 73/828
(58) Field of Search .................. 73/828, 826, 862.381, 73/862.391; 114/109, 102.12

(56) References Cited

U.S. PATENT DOCUMENTS

| | | | |
|---|---|---|---|
| 3,882,719 A | * 5/1975 | Fletcher et al. | 73/862.42 |
| 3,935,828 A | 2/1976 | Pfund | |
| 4,055,137 A | 10/1977 | Motai et al. | |
| 4,958,581 A | 9/1990 | Denison | |
| 5,051,919 A | * 9/1991 | Deuar | 702/43 |
| 5,333,509 A | * 8/1994 | Dimen | 73/862.381 |

OTHER PUBLICATIONS

Navtec Norseman Gibb Catalogue, p. 51, (See Navtec website: http://www.navtec.net/).

* cited by examiner

Primary Examiner—Hezron Williams
Assistant Examiner—Corey D. Mack
(74) Attorney, Agent, or Firm—Richard C. Litman

(57) ABSTRACT

A method and apparatus for monitoring and measuring the load in a sailboat's rigging components. A rigging component such as a turnbuckle is modified to incorporate a sensing element, such as a strain gage. Strain gages are bonded and wired into a measuring circuit. The strain gage measures the strain under a load and generates an electrical signal that is directly proportional to the tension load. The load is then monitored and/or displayed using standard data acquisition equipment. The strain gage also identifies loose rigging such as may happen with shrouds which are subject to sudden high loading with movement of the boat and allows the operator to tighten that shroud or other piece of rigging.

14 Claims, 5 Drawing Sheets

METHOD OF MONITORING/MEASURING RIGGING LOADS

BACKGROUND OF THE INVENTION

1. Field of the Invention

The present invention relates to a method and apparatus for measuring rigging loads, such as for the standing rigging of sail boats. More particularly, the present invention relates to a method and apparatus for measuring rigging loads utilizing strain gages.

2. Description of the Related Art

In sailboats, all rigging for supporting the mast and keeping it straight which are permanently installed and provide the means to transmit sail power to the hull are called standing rigging. The components and hardware that make up the standing rigging in a boat are designed to work with the hull to transmit wind power into forward motion. This process is accomplished most efficiently when the rigging is properly tuned to the optimum component tension.

The loading that occurs in all standing rigging can be classified as either static or dynamic. Static loads are caused by the tightening or loosening of the rigging hardware and are always present. The easiest way to increase or decrease the amount of static loading is by adjusting turnbuckles (or similar hardware). Static loads are considered to be only those caused by the tightening of standing rigging components. Allowable constant static loading does not have a negative effect in the life of components.

Dynamic loads, also referred to as "live loads" are caused by everything else. The wind changes in course, wave action, sail trimming and everything else that changes during sailing create dynamic loading on the rigging. The amount of dynamic loading can be modified by removing, trimming or changing sails, or changing course. Dynamic loading, because of its cyclic nature, has a negative effect and shortens the useful life of components.

Static and dynamic loads are additive. This is a very important fact with potentially serious implications. If the level of static load on a stay or shroud is set very high by the rigging tuner, it may take very little dynamic load to exceed the breaking strength of the wire or other component. The opposite situation can also create an undesirable situation. If the amount of static load on a stay or shroud is set too low by the rigging tuner, the amplitude of the cyclic stress due to dynamic loading will be greater. This has a negative impact on rigging useful life.

It would be desirable to have a system capable of measuring tensile loads on rigging such as standing rigging on a sailboat or rigging for other purposes. Systems presently used on sailboats are generally restricted to the initial tuning of the rigging and are relatively inaccurate. It would be desirable to have a strains measuring system which can monitor dynamic stresses during operation of the sail boat so that choices can be made of the proper sails to fly for a given set of conditions under which the sailboat is operating.

U.S. Pat. No. 4,055,137, issued Oct. 25, 1977, to Motai et al., describes a vessel mooring system in which tension detectors are incorporated into a plurality of mooring devices so that the vessel is moored to the mooring facility in a well-balanced condition by adjusting the tensions exerted on the respective mooring devices by using tension signals issued from the tension detector.

U.S. Pat. No. 4,958,581, issued Sep. 25, 1990, to Denison describes a sailboard apparatus using strain gages for measuring the shearing forces between the mast and the sailboard.

U.S. Pat. No. 3,913,396, issued Oct. 21, 1975, to Elliot describes a monitoring system for moored floating vessels using tension measuring devices to send signals to a monitoring station.

U.S. Pat. No. 3,935,828, issued Feb. 3, 1976, to Pfund describes a tension sensor with a relatively rigid bow frame clipped onto a backstay. A strain gage is interposed between the frame and the backstay to sense the tension and send a signal to an indicating meter to provide an indication related to the forward thrust.

The NAVTEC NORSEMAN GIBB CATALOGUE, p. 51, describes the "Grand Prix Load Pin" that measures tension on the members to which it is attached. This device replaces standard clevis pins in the rigging. In order for this device to accurately measure loads in the rigging, it must be properly aligned. If the pin rotates due to vibration or other movement, it incurs a signal error equal to the cosine of the angle between the ideal alignment and the actual alignment. The "Grand prix Load Pin" is similar to products manufactured and sold by several manufacturers. These products are sold under names such as Load Pins, Shear Pins and Clevis Pins and are used in a multitude of machinery or equipment. Examples of such equipment are cranes, hoists, seismic restraints and towing equipment. Also shown is a Rod Cap or Eye combined with a transducer and monitored by a signal processors and backlit display units to form a "Grand Prix Load Cell System". As above, in order for these devices to accurately measure loads in the rigging, they must be properly aligned. The inventive system is both different and unique with respect to the products described above in that: (1) by design and construction it is always aligned with the load path, thereby measuring 100% of the actual load accurately. The inventive system is also unique in that (2) in addition to providing the load measurement, it is also the means through which load adjustments are made, i.e., by turning the instrumented turnbuckle clockwise or counter-clockwise. It is (3) that the current invention is more accurate than the "Grand Prix Load Pin" or the transducer fitted Rod Cap or Eye for which there are no readily available published accuracy specifications (other products of similar design typically have accuracies between 0.5 and 1.0% of rated load). The current invention has a measured accuracy of 0.10% of rated load.

None of the above inventions and patents, taken either singularly or in combination, is seen to describe the instant invention as claimed. Thus, a method of monitoring/measuring rigging loads solving the aforementioned problems and achieving a high degree of accuracy is desired.

SUMMARY OF THE INVENTION

The present invention is a method and apparatus for monitoring and measuring the load in a sailboat's rigging components. A rigging component such as a turnbuckle is modified to incorporate a sensing element, such as a strain gage. Strain gages are bonded and wired into a measuring circuit. The strain gage measures the strain under a load and generates an electrical signal that is directly proportional to the tension load. The load is then monitored and/or displayed using standard data acquisition equipment. The strain gage also identifies loose rigging such as may happen with shrouds which are subject to sudden high loading with movement of the boat and allows the operator to tighten that shroud or other piece of rigging.

According to the invention, by monitoring loads during rigging, the rigger can measure the interplay between components and adjust rigging hardware to obtain an optimally tuned rig. In addition, rigging loads can be measured while sailing or underway This information can be used by the crew to make informed decisions, such as changing or taking down sails, that can, among other things, preserve the structural integrity of the rigging equipment, the sails and ultimately the vessel.

The monitoring system, depending on its configuration, allows for two types of operation. The first mode, "Static Monitoring" or "rigging Monitoring," allows the rigging tuner to set up and tune standing rigging to its optimum condition by measuring static loads. It requires sensors and a handheld device. The second mode, "Dynamic Monitoring" or "Sailing Monitoring" allows the crew to monitor loads while sailing. It requires sensors and a permanently installed display instrument. The same sensors are required for both types of monitoring, however, dynamic monitoring requires a permanently installed display or displays. In summary, static monitoring is used for rigging setup and tuning, and dynamic monitoring is used to make sailing decisions.

Static or Rigging Monitoring is used when installing the mast and setting up standing rigging at a dock or marina. The sensors are installed in the same manner an equivalent part is installed, i.e., a turnbuckle sensor is installed in the same way as all standard turnbuckle is installed. Once all rigging is in place, the rigger, boatyard personnel or owner starts tensioning all components while monitoring loads. Monitoring is done by connecting a handheld instrument to each sensor at a time and reading the display. Adjustments are performed on each component while monitoring until the desired tension or mast compression loads are obtained. The optimum tension or compression is obtained from the yacht designer or builder. In the absence of this information, about 15% of the yield strength of the rigging cable or rod is used.

Dynamic monitoring is used to make sailing decisions. Whereas static monitoring is used for rigging setup prior to sailing, dynamic monitoring is used underway to modify sailing configuration. Sailing configuration(number of sails, size, and weight) can be altered to maintain or increase sailing speed and to preserve rigging integrity, the sail, and/or vessel safety. The first requirement for dynamic monitoring is that rigging setup and static monitoring have been performed. The same sensors are used for both modes of operation. The main difference in operating modes resides in the type of display being used and the use of the monitoring information by the crew. A permanently installed display or displays are wired to the sensors to indicate total tension. Different sensors can be monitored by having several displays or one display with a selector switch. In addition to total tension, the display has a colored bar graph that changes from green to yellow to red, depending on the magnitude of the load. Operation within the green area would indicate acceptable loads, whereas, operation in the red zone would indicate dangerous tension levels.

Monitoring systems may be configured to measure one loading point, several, or all connections between rigging and hull. The most basic system consists of a turnbuckle or similar device connecting the backstay to the transom. This system would be useful for static monitoring. The most complete system would consist of one sensor for every stay and shroud and one display per sensor. This system can be used for static and dynamic monitoring.

Some standing rigging components and running rigging components, besides the strain-gaged turnbuckle, which may be similarly modified with strain sensors include tangs, backstay adjuster components, chain plates, rod rigging, shroud and stay extension, mast base load cells, traveler load cells, swage studs, and stem ball fittings.

The benefits derived from the inventive monitoring system are in the areas of safety, sailing efficiency and longer life for rigging hardware, hull and sails.

More specifically, the benefits from proper tuning of standing rigging include: (1) increased sailing efficiency, (2) prevention of high stress concentration areas on the hull or rigging resulting from uneven load sharing between stays and shrouds, (3) avoidance of excessive dynamic stresses due to loose or under tensioned rigging being suddenly loaded; this condition unnecessarily adds and accumulates fatigue stress cycles to the rigging, (4) avoidance of excessive static stresses on individual components and hull due to over tensioned components.

The benefits from monitoring while sailing include: (1) availability of quantitative information to the crew that can be used to make boat and sail handling decisions, (2) overload conditions on the rigging can be avoided or eliminated by changing or taking down sails or taking other appropriate action, (3) damage to sails can be avoided, and sail configuration and wind strength in combination with loading information may be used by trial and error, or logical thinking, to increase sailing efficiency, i.e., the conversion of wind power into forward movement.

Accordingly, it is a principal object of the invention to provide a system for measuring and monitoring load and strain in sailboat rigging.

It is another object of the invention to provide a system as above which allows for highly accurate tuning of standing rigging.

It is a further object of the invention to provide a system as above which measures dynamic loading on rigging, particularly stays and shrouds.

Still another object of the invention is to provide a system as above providing information which assists the operator in selection of sails.

It is yet another object of the invention to provide a system as above which employs instruments which provide visual warning of overstress or other condition.

Still another object of the invention is to provide an instrumented turnbuckle from which strain on the rigging at the turnbuckle may be determined.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
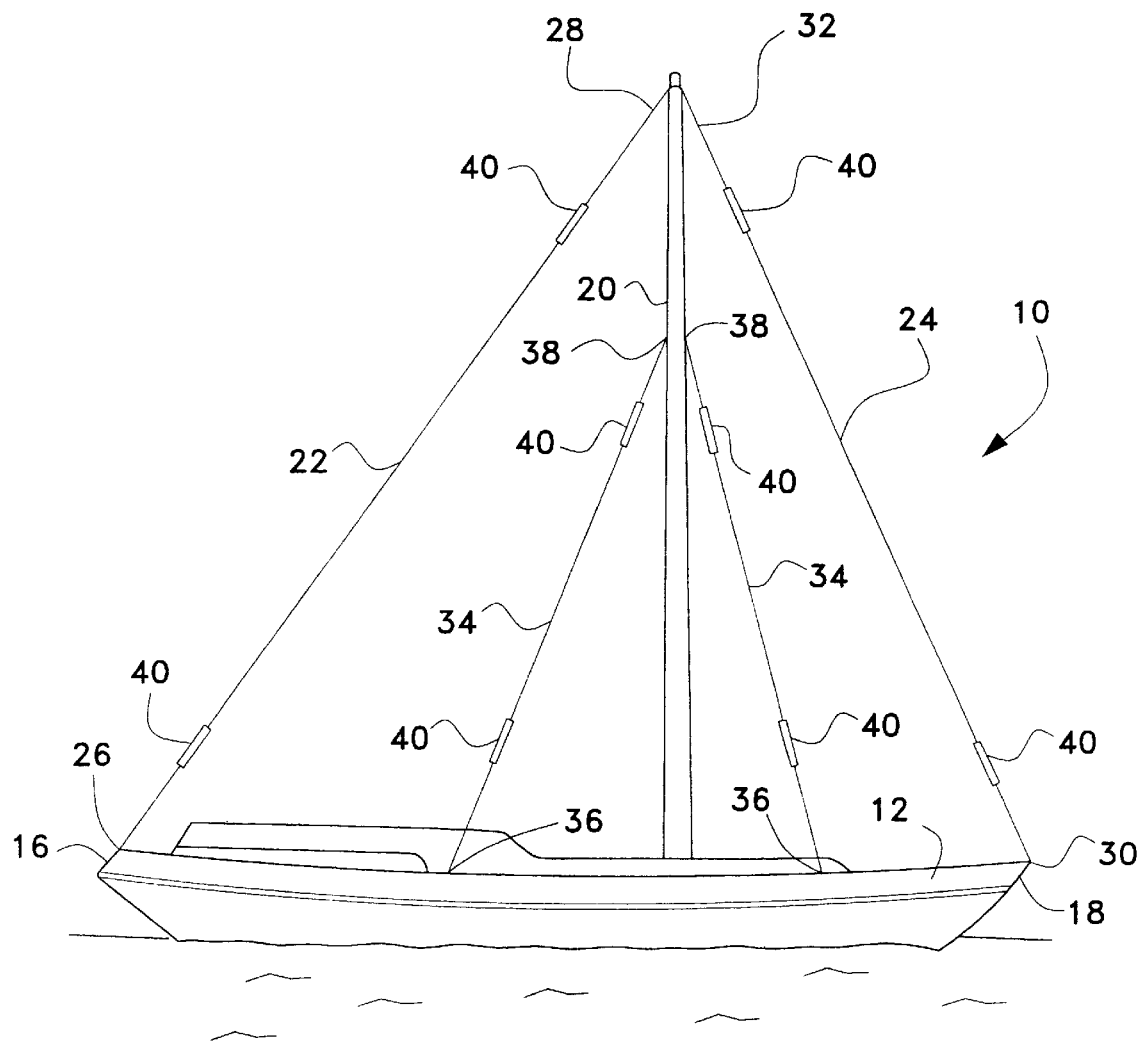
FIG. 1 is an environmental, elevational view of a sail boat with a system for measuring rigging loads and strain employing strain gaged turnbuckles according to the present invention.

Referring to FIG. 1 there is shown an environmental, elevational view of a sail boat with a system for measuring rigging strain employing strain gaged turnbuckles wherein sailboat 10 has hull 12 with stern 16, bow 18, and mast 20. The rigging for mast 20 includes backstay 22 and forestay 24, each attached at backstay hull attachment point 26 and backstay mast attachment point 28, and at forestay hull attachment point 30 and forestay mast attachment point 32, respectively. Shrouds 34 are attached at shroud hull attachment points 36 and shroud mast attachment point 38. As shown, strain gaged turnbuckles 40 are installed near respective mast attachment points and hull attachment points on each of the backstay 22, the forestay 24, and shrouds 34, respectively Turnbuckle strain during rigging and tuning may be indicated in this configuration by plugging a handheld instrument into each turnbuckle 40 in turn. Lead lines and instrumentation for indication of turnbuckle strain during boat operation are not shown.

Figure 2A:
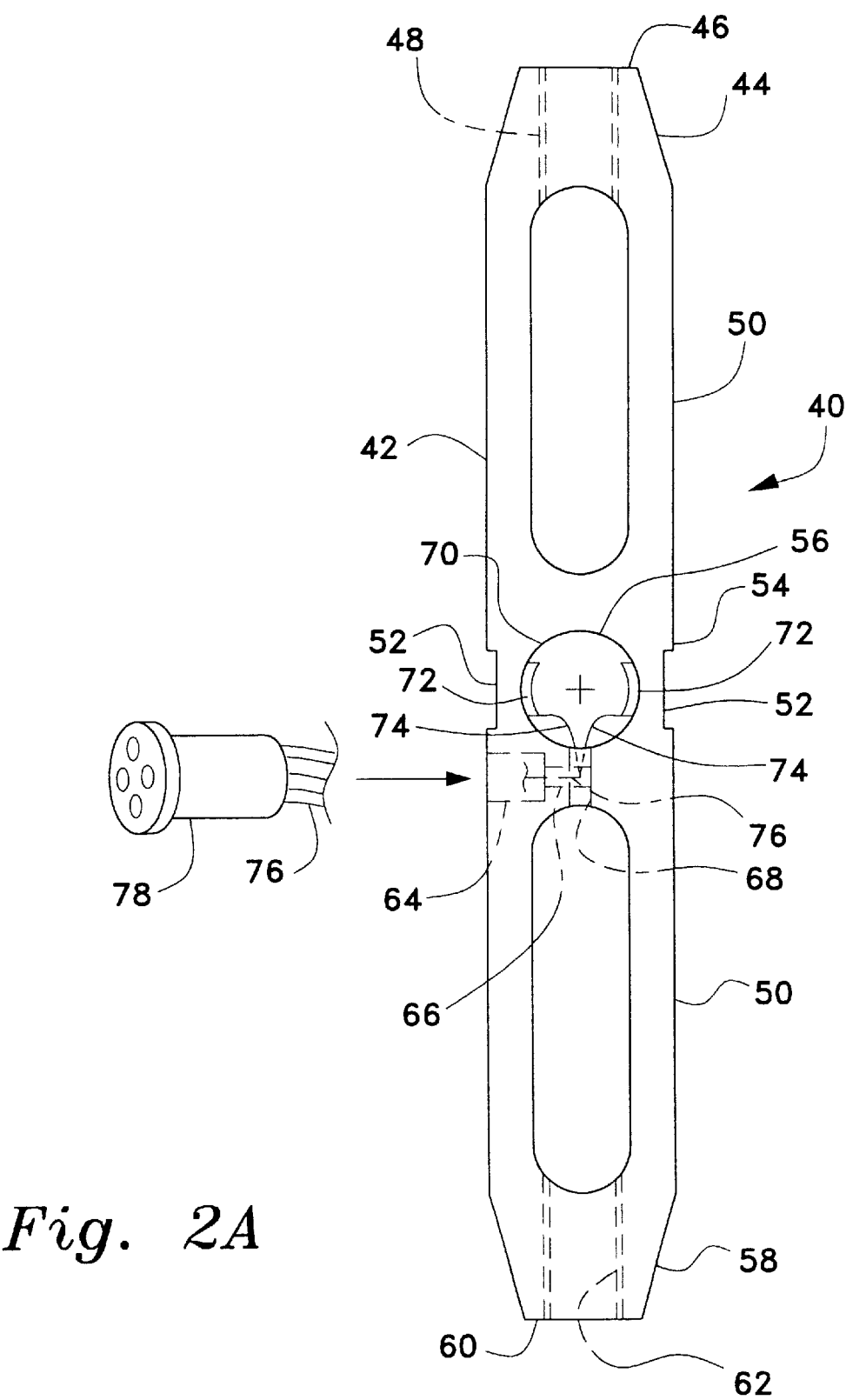
FIG. 2A is an elevational view of the strain gage-instrumented turnbuckle of the present invention.
Figure 2B:
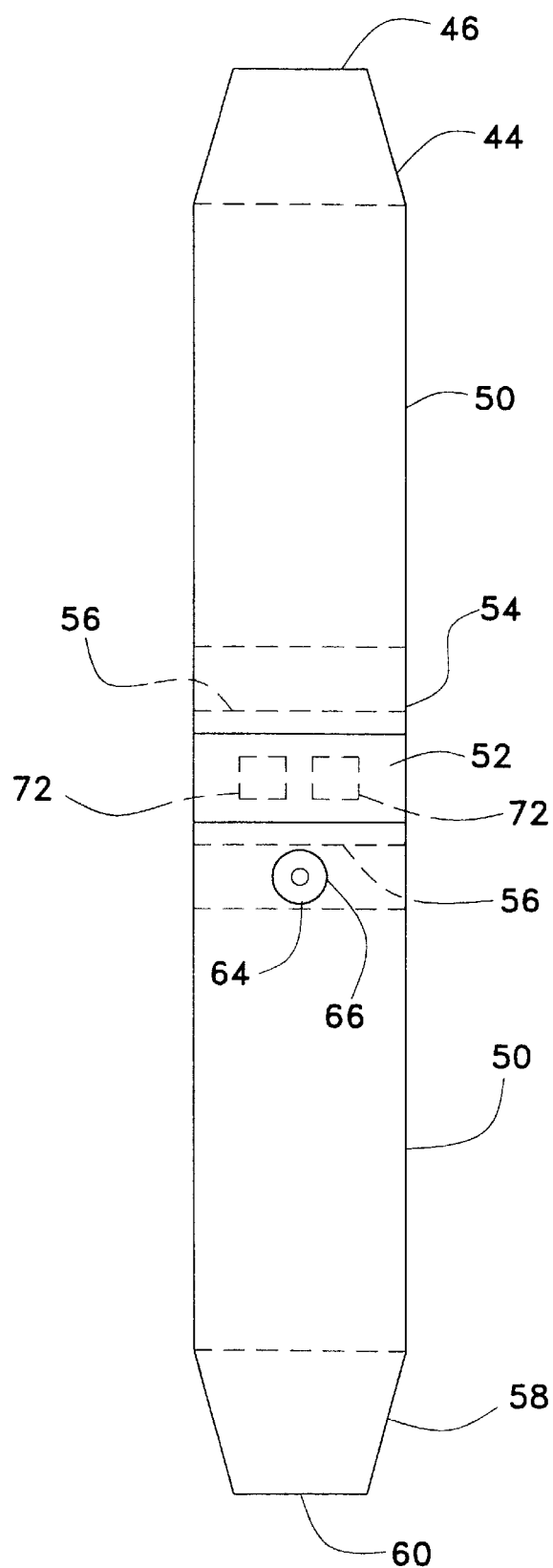
FIG. 2B is an elevational side view of the turnbuckle of FIG. 2A.

Referring to FIGS. 2A and 2B, there is shown a first elevational exploded view and a 90 degree rotated elevational view of the strain gage turnbuckle 40 prepared for rigging installation wherein generally cylindrical body 42 features upper tapered wall 44, leading to upper end 46 and housing left hand threaded concentric bore 48 leading to slotted rigging receiving portion 50. Centrally located in body 42 flats 52 of crank receiving portion 54 for receiving a crank, such as an open end wrench, for adjustment of strain gage turnbuckle 40. Strain gage bore 56 is located at a 90-degree angle to crank flats 52. Lower tapered wall 58 leads to lower end 60, housing right hand threaded concentric bore 62. Instrument connector seat 64 is a partial radial bore spaced below strain gage bore 56 and connects with coaxial radial instrument wiring bore 66 which, in turn, intersects axial instrument wiring bore 68 located along the longitudinal axis of generally cylindrical body 42, thus forming a path between connector 64 and strain gage bore 56. Strain gages 72 are located on opposing sides of wall 70 of strain gage bore 56. Strain gage instrument wiring 74 leads from strain gages 72 and forms strain gage instrument wiring cable 76 which attaches with four-hole connector 78 which, when assembled, is located within connector seat 64 (wiring and connector are not shown in FIG. 2B). The strain gage instrument wiring 74 is wired into a Wheatstone Bridge (see FIG. 3B, below) before reaching connector 64.

Figure 3A:
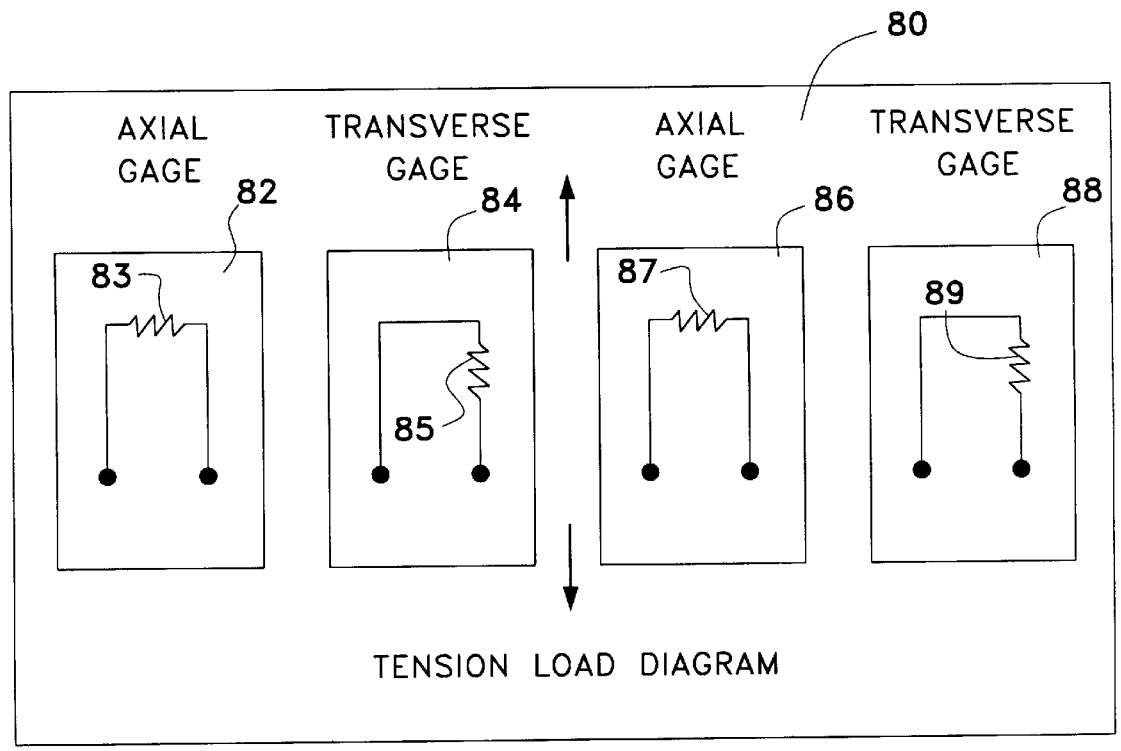
FIG. 3A is a diagrammatic illustration of the instruments useful for indicating strain in the present invention.
Figure 3B:
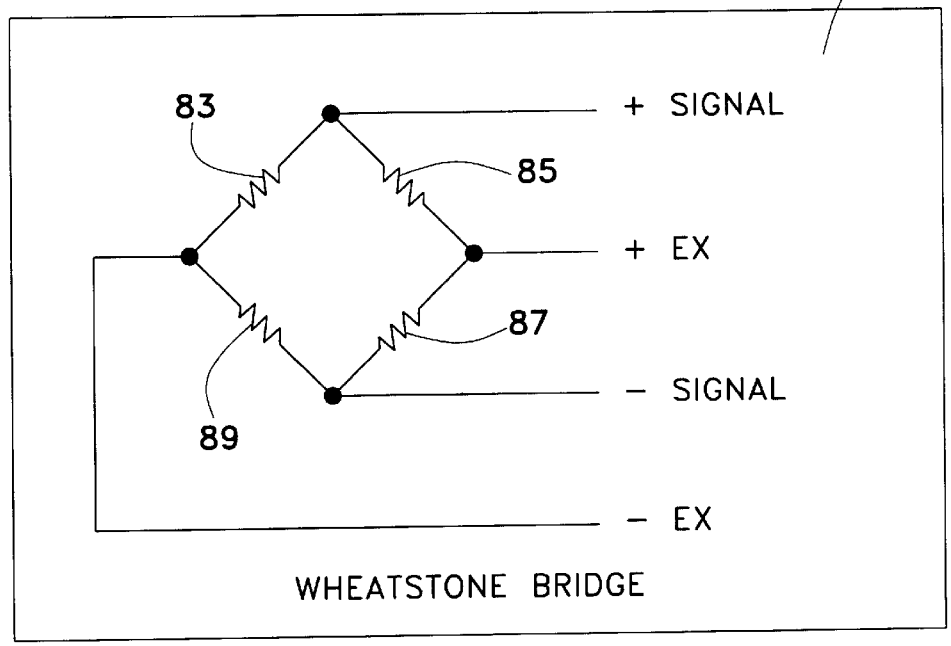
FIG. 3B illustrates a typical Wheatstone Bridge incorporating the strain gages of FIG. 3A.

Referring to FIG. 3A and 3B there is shown a diagrammatic illustration of the installation of strain gages 72 (see FIG. 3A) useful in the present invention including first axial gage 82 having resistance 83, first transverse gage 84 having resistance 85, second axial gage 86 having resistance 87 and second transverse gage 88 having resistance 89. The resistance of the gages varies with strain as indicated by the opposing arrows. The changes of resistance may be measured using a Wheatstone bridge as illustrated in FIG. 3B.

Figure 4:
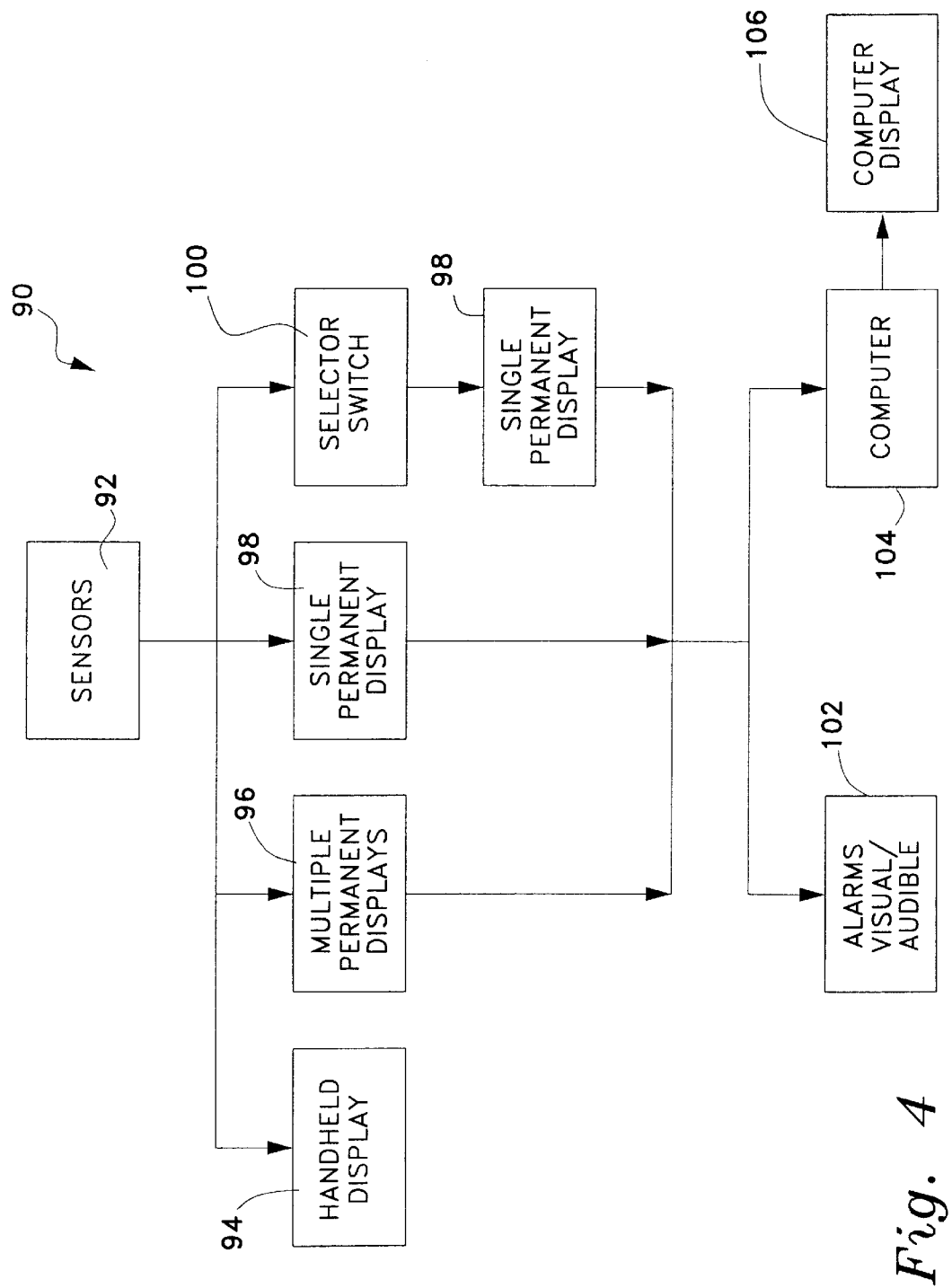
FIG. 4 is a diagrammatic illustration of the instrumentation systems of the present invention as interfaced with the sensors.

Referring to FIG. 4, there is shown a diagrammatic illustration or flow chart 90 depicting the instrumentation systems of the present invention as interfaced with the strain gaged turnbuckle or other strain sensor 92 which is connected alternatively with a handheld display 94, multiple permanent displays 96, a single permanent display 98, or selector switch 100 connected to a single permanent display 98. In all systems except the handheld display 94, visual and/or audible alarms 102 and/or a computer 104 having display 106 are employed, connected for warning purposes, typically while the boat is under way.

All strain sensors are made using a suitable base metal. The most common materials used are any of the heat treatable stainless steels.

Each sensor is instrumented with precision strain gages and waterproofed to stand the rigors of a marine environment. The inventive strain gaged turnbuckle has the same form and function as standard rigging components. Other rigging components such as tangs, chain plates, rod rigging, and backstay adjuster may be configured with strain gages as in the described turnbuckle.

Display instruments are used to provide a visual reading of the loads encountered by the different sensors. The readings are shown in engineering units, i.e., Lbs., Kgs, Newtons, etc. Permanent type displays also have an LED colored bar graph that changes from green to yellow to red depending on the magnitude of the load. The values at which colors change are programmable to any value.

Displays can be either handheld battery powered units or permanently mounted 12VDC powered electronic displays. Displays may also have communications capabilities with computers and/or internal logic to activate visual or audible alarms when preset load levels are exceeded. Other data acquisition equipment can be connected to the instrument's analog or digital ports. This could be done, for example, to obtain fatigue life information over long periods of time.

The sensors can interface with any strain gage compatible data acquisition equipment currently available.

Strain gages require an excitation voltage to be provided to the Wheatstone bridge. The signal is then a function of the strain experienced by the sensor and the excitation voltage. The output of a strain gage sensor is expressed in MV/V (millivolts of signal per Volts of excitation) Signal conditioning and data acquisition equipment used with strain gages typically provide an excitation voltage of 10 Volts and amplify the millivolt signal from the sensor. They then convert to engineering units and display, store or process the signal. The preferred indicators have a digital display and some have peak hold capabilities. In addition, most of these instruments have at a minimum RS-232 communications capabilities to interface and communicate with computers. Examples of indicators useful for the present invention include Ohaus, Model No. C-11; AMDI, Model No. 1601C; OTEK, Model No. HI-QTBS; and Electro Numerics, Model No. Micro-P.

Data acquisition equipment useful with the present invention include computers and chart recorders. When using computers, the appropriate hardware and software must be employed. There are several options for interfacing the inventive sensors to computers. All of the digital indicators mentioned above are useful as an intermediate instrument between the sensors and the computer. All that is required is an RS-232 cable and software that can read, store, and display RS-232 information. An alternative approach is to wire the inventive sensors directly to analog to digital(A/D) data acquisition cards installed inside computers and to use commercially available software. An example of commercially available hardware and software is SuperLogics A/D Card, Model No. DAQP-16 hardware and SuperLogics Winview Software.

It is to be understood that the present invention is not limited to the embodiments described above, but encompasses any and all embodiments within the scope of the following claims.

I claim:

1. A method of measuring and monitoring sailboat rigging loads comprising the steps of:

installing strain gage equipped rigging components on a plurality of rigging elements on a sailboat;

adjusting the tension of said rigging elements;

taking a readout of a handheld instrument attached to each of said strain gage components in turn;

readjusting the tension of said rigging elements according to the readout of said hand-held instrument;

repeating the above said steps of readjusting the tension and said taking readouts of said instrument until the desired tension is obtained in each of said rigging elements;

installing a monitor system for providing continuous readouts of strain measured by said installed strain gage equipped rigging components; and observing said continuous readouts of strain so as to determine that said readouts are within allowable limits for each rigging element.

2. The method of claim 1, further comprising the steps of installing audible or visual alarms responsive to said continuous readouts of strain and activated upon said readouts being above allowable limits; and taking action to reduce strain on a rigging element corresponding to said alarm.

3. The method of claim 1, further comprising the step of adjusting or replacing sails based on information gained from said continuous readouts.

4. The method of claim 1, further comprising the steps of installing a computer system for storing and displaying said continuous readouts of said monitoring system; and integrating said readouts over time to monitor each said rigging element, comparing the result to the useful life of said rigging element, and replacing said rigging element once it has reached its useful life.

5. A strain gage equipped turnbuckle comprising:

a standard turnbuckle having a generally cylindrical body defining a central lengthwise axis;

said generally cylindrical body having:

an upper portion tapering to an upper end and defining a left hand threaded axial bore;

a lower portion tapering to a lower end and defining a right hand threaded axial bore;

a central portion between said upper and said lower portions having upper and lower slotted rigging receiving portions having inspection slots and a centrally disposed crank portion having a pair of opposed crank flats located between said receiving portions for operation to adjust said turnbuckle;

said turnbuckle having a gage location bore located transverse to and through said crank portion;

said turnbuckle having an instrument connector seat bore extending radially into said cylindrical body and spaced below and parallel to said gage location bore;

said turnbuckle having an instrument wiring bore located parallel to said cylindrical axis and connecting said instrument connector seat to said gage location bore;

at least one axial strain gage mounted within said location bore;

a connector adapted to fit within said connector seat; and at least two conducting wires connected between said connector and said axial strain gage.

6. The turnbuckle of claim 5, further comprising at least two axial strain gages and at least two transverse gages, and at least four conducting wires connected between said connector and said strain gages, said connector being a four-wire connector.

7. The turnbuckle of claim 6, wherein said gages and said wiring form a Wheatstone Bridge.

8. The turnbuckle of claim 6, in combination with an instrument adapted for connection with said four wire connector and providing a readout of strain measured by said gages.

9. A system for measuring and monitoring sailboat rigging loads comprising:

a plurality of strain gage rigging components operatively attached to a plurality of corresponding rigging elements; and a plurality of instruments having a plurality of corresponding displays for operable attachment to said strain gage rigging components, whereby a strain readout is obtained corresponding to strain detected by said strain gage rigging components;

at least one of said instruments being a permanent instrument having a readout presenting a green color when the strain gage is in a safe zone, a yellow color when the strain gage is in a warning zone, and a red color when the strain gage is in a danger zone corresponding to near breaking level for the rigging element monitored;

each of said rigging components being a turnbuckle.

10. The system of claim 9, wherein at least one of said instruments is hand held.

11. The system of claim 9, further comprising at least one alarm connected with said permanent instrument so as to warn the boat operator rigging tension overload.

12. The system of claim 9, further comprising a selector switch for obtaining instrument readouts for said plurality of strain gage rigging components on a single instrument display.

13. The system of claim 9, further comprising a computer operatively attached to said at least one permanent instrument for storing and integrating readings over time for determining useful life remaining for a particular rigging element.

14. The system of claim 9, further comprising a computer having an analog to digital acquisition card and operatively attached directly to said at least one of said plurality of strain gage rigging components.

* * * * *